US008589859B2

(12) United States Patent
Kaulgud et al.

(10) Patent No.: US 8,589,859 B2
(45) Date of Patent: Nov. 19, 2013

(54) COLLECTION AND PROCESSING OF CODE DEVELOPMENT INFORMATION

(75) Inventors: Vikrant Shyamkant Kaulgud, Maharashtra (IN); Vibhu Saujanya Sharma, Aligarh (IN)

(73) Assignee: Accenture Global Services Limited, Dublin (IE)

( * ) Notice: Subject to any disclaimer, the term of this patent is extended or adjusted under 35 U.S.C. 154(b) by 566 days.

(21) Appl. No.: 12/873,682

(22) Filed: Sep. 1, 2010

(65) Prior Publication Data
US 2011/0055799 A1    Mar. 3, 2011

(30) Foreign Application Priority Data

Sep. 1, 2009   (IN) .......................... 1986/MUM/2009

(51) Int. Cl.
*G06F 9/44*   (2006.01)

(52) U.S. Cl.
USPC ............ 717/101; 717/102; 717/103; 717/104

(58) Field of Classification Search
None
See application file for complete search history.

(56) References Cited

U.S. PATENT DOCUMENTS

| | | | |
|---|---|---|---|
| 6,408,403 B1 | 6/2002 | Rodrigues et al. | |
| 6,662,312 B1 | 12/2003 | Keller et al. | |
| 6,671,874 B1 | 12/2003 | Passova | |
| 6,810,364 B2 | 10/2004 | Conan et al. | |
| 7,020,797 B2 | 3/2006 | Patil | |
| 7,299,455 B2 | 11/2007 | Anderson et al. | |
| 8,032,863 B2 * | 10/2011 | Kolawa et al. | 717/124 |
| 8,122,425 B2 * | 2/2012 | Corral | 717/101 |
| 2003/0070120 A1 | 4/2003 | Michael et al. | |
| 2003/0188290 A1 * | 10/2003 | Corral | 717/101 |
| 2005/0015675 A1 | 1/2005 | Kolawa et al. | |
| 2005/0071818 A1 | 3/2005 | Reissman et al. | |
| 2005/0114830 A1 * | 5/2005 | Knutson et al. | 717/102 |
| 2005/0166178 A1 | 7/2005 | Masticola et al. | |
| 2005/0204201 A1 | 9/2005 | Meenakshisundaram et al. | |
| 2006/0095276 A1 * | 5/2006 | Axelrod et al. | 705/1 |
| 2006/0123389 A1 * | 6/2006 | Kolawa et al. | 717/101 |
| 2008/0092108 A1 * | 4/2008 | Corral | 717/101 |
| 2008/0222608 A1 | 9/2008 | Gartner et al. | |

(Continued)

FOREIGN PATENT DOCUMENTS

GB    2293669 A1    3/1996

OTHER PUBLICATIONS

Xiang Liu et al.; Design Architecture, Developer Networks, and Performance of Open Source Software Projects; 2007 Twenty Eighth International Conference on Information Systems; 18 pages; <http://softwareecosystems.com/design_architecture_people_network.pdf>.*

(Continued)

*Primary Examiner* — Thuy Dao
*Assistant Examiner* — Cuong V Luu
(74) *Attorney, Agent, or Firm* — Harrity & Harrity, LLP

(57) ABSTRACT

Within each of a plurality of developer workstations contributing to a software development project, event data concerning at least one quality-related issue is collected via a development tool implemented by the developer workstation. The event data is stored locally and periodically output as at least part of code development information. The code development information is provided to a quality management component for subsequent processing, particularly the determination of one or more quality metrics. At least a portion of such quality metrics may be subsequently provided to the developer workstation for display on a suitable display device.

26 Claims, 4 Drawing Sheets

(56) References Cited

U.S. PATENT DOCUMENTS

| | | | |
|---|---|---|---|
| 2009/0070734 A1* | 3/2009 | Dixon et al. | 717/102 |
| 2009/0138843 A1* | 5/2009 | Hinton et al. | 717/101 |
| 2009/0210855 A1* | 8/2009 | Ramanathan | 717/102 |
| 2011/0126168 A1* | 5/2011 | Ilyayev | 717/103 |

OTHER PUBLICATIONS

Andrew Funk et al.; Application of a Development Time Productivity Metric to Parallel Software Development; 2005 ACM; pp. 8-12; <http://dl.acm.org/citation.cfm?id=1145323>.*

Yang Aimin et al.; Based on Quantification Software Quality Assessment Method; 2009 Journal of software; pp. 1110-1118; <http://www.ojs.academypublisher.com/index.php/jsw/article/view/041011101118/1445>.*

Ladan Tahvildari et al.; Quality-driven software re-engineering; 2002 The journal of systems and software, pp. 225-239; <http://ac.els-cdn.com/S0164121202000821/1-s2.0-S0164121202000821-main.pdf?>.*

Stephanie D. Teasley et al., Rapid Software Development through Team Collocation; 2002 IEEE; pp. 671-683; <http://ieeexplore.ieee.org/stamp/stamp.jsp?tp=&arnumber=1019481>.*

Anne Smith Duncan; Software Development Productivity Tools and Metrics; 1988 IEEE; pp. 41-48; <http://ieeexplore.ieee.org/stamp/stamp.jsp?tp=&arnumber=93686>.*

* cited by examiner

COLLECTION AND PROCESSING OF CODE DEVELOPMENT INFORMATION

FIELD OF THE INVENTION

The instant disclosure relates generally to the development of software code and, in particular, to techniques for collecting and processing code development information in connection with software quality assessments.

BACKGROUND OF THE INVENTION

As known in the art, software code comprises instructions that may be used to control or instruct the operation of one or more processing devices, such as microprocessors, microcontrollers, co-processors, etc. Indeed, software code is ubiquitous and pervades many aspects of modern day technology. Further, it is not uncommon for software development projects to require the services of numerous software code developers and their supervisors for periods of time stretching over many months or even years. In order to produce, well-designed, efficient code, it is crucially important to engage in quality assessments, i.e., to take those steps necessary to ensure code is being written in accordance with industry and project-specific quality standards, is meeting appropriately defined benchmarks and delivers the functionality as per requirements. Usually, project code quality standards and benchmarks are pre-defined for a project, either by the customer, by the software development service provider or both.

Typical code quality processes rely on periodic centralized quality assessments to ensure that quality targets are achieved. These assessments are carried out using automated tools and/or manual checks on the complete code-base (i.e., substantially all of the code capable of being tested at that point) as it provides a complete quality view of the software-under-development. The granularity or frequency of the assessment period determines how proactive a project team can be in resolving quality issues. For example, quality assessment performed every day provides substantial opportunity for proactive resolution of quality issues, i.e., the cost of solving quality issues may be reduced given that problems or potential problems arc identified earlier.

As an alternative to centralized quality assessments, a popular choice of quality assessment and control is developer-centric assessment. In this approach, quality assessment is done at each developer's workstation and based on that section of code assigned to the developer. Typically code quality tools such as PMD, "FINDBUGS", FXCop and test harnesses such as JUnit are used for assessing code quality at developers' workstations. These tools run on a developer's workstation either in an integrated development environment (IDE) or in a standalone environment, e.g. on a operating-system command prompt. Given the de-centralized nature of this approach, a holistic view of quality at any given point in time is not available. Nevertheless, such de-centralized quality assessments are particularly desirable in those instances in which functionality testing is difficult to implement in a centralized manner.

While both centralized and de-centralized quality assessment approaches have various advantages and disadvantages, techniques drawing upon the benefits of both approaches while minimizing their respective disadvantages would represent a welcome addition to the field.

SUMMARY OF THE INVENTION

The instant disclosure describes various techniques for the collection and processing of code development information, particularly in furtherance of performing software code quality assessments. Generally, this is accomplished by detecting, within each of a plurality of developer workstations, event data concerning at least one quality-related issue that occurs through use of a development tool implemented by the developer workstation. As it is detected, the event data is stored in local storage within the developer workstation. From time to time, the event data is then output as at least part of code development information. In an embodiment, the code development information is provided to a quality management component for subsequent processing, particularly the determination of one or more quality metrics. At least a portion of such quality metrics may be subsequently provided to the developer workstation for display on a suitable display device.

In an embodiment, the event data is detected by a development tool interface component that interacts with the development tool, for example, via a suitable application protocol interface or event logs implemented by the development tool. The development tool interface component, appropriately configured according to user-configurable event specification data, stores the event data as it is detected in the local storage. A development tool reporting component, likewise configured according to user-configurable event reporting data, thereafter retrieves the event data stored in the local storage and outputs it accordingly. According to this embodiment, the quality management component may be operatively connected to the developer workstation (via, for example, one or more suitable communication networks) such that the developer workstation may receive the development tool interface and reporting components from the quality management component for subsequent installation on the developer workstation.

Quality assessment may be initiated through the determination of design data that describes the structure of software code via analysis of the software code and/or software code metadata. Thereafter, based on the design data and identifications of developers, a developer mapping may be produced, the developer mapping indicating portions of the software code corresponding to each individual developer. Based on the developer mapping and code development information, one or more quality metrics for each individual developer may be determined. The individual quality metric(s) determined in this manner may then be provided to a developer workstation for subsequent display thereon. Furthermore, aggregated quality data may be collected for those portions of the software code corresponding to more than a single developer, e.g., across the entire software code base, for subsequent determination of one or more aggregated quality metrics. In this vein, the aggregated quality metric(s) may be provided to one or more supervisors or other management personnel.

In an embodiment, the quality management component may comprise a variety of appropriately configured (sub-) components. In particular, a code design discovery component may be provided that determines the design data and thereafter provides the design data to a developer mapper component. In turn, the developer mapper component determines and provides a developer mapping to a quality assessment component that is also configured to receive the code development information. The quality assessment component is further configured to determine the at least one individual quality metric and, optionally, the at least one aggregated quality metric. A report generation component may also be provided to output the at least one individual quality metric and/or the at least one aggregated quality metric.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
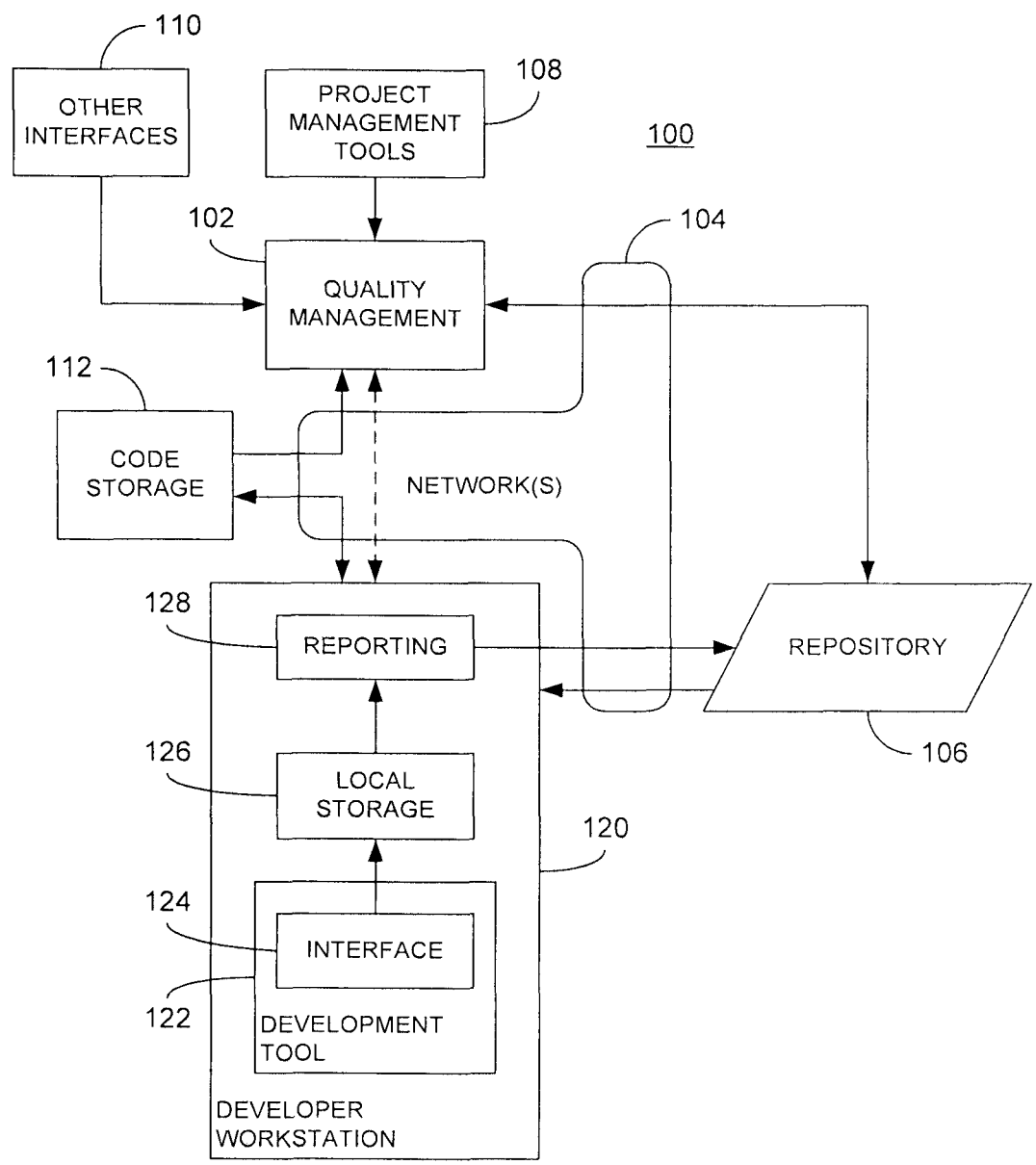
FIG. 1 is a block diagram of a system for the development of software code in accordance with the instant disclosure.

FIG. 1 illustrates a system 100 for the development of software code in accordance with the instant disclosure. As shown, the system 100 comprises a quality management component 102 that communicates, via one or more networks 104, with a repository 106. The quality management component 102 is also operatively connected to one or more project management tools 108 and/or one or more other interfaces 110. Although the quality management component 102 is illustrated as being directly coupled to the project management tool(s) 108 and/or the other interface(s) 110, it is understood that such connectivity may be accomplished via intervening communication networks, such as the illustrated network(s) 104. Further still, the quality management component 102 communicates with a code storage component 112 and, optionally, with a developer workstation 120 via the network(s) 104. Although a single developer workstation 120 is illustrated for simplicity, those having ordinary skill in the art will appreciate that software development systems typically comprise a plurality of such workstations. As shown, the developer workstation 120 is operatively connected to the repository 106 and the code storage component 112 via the network(s) 104. In an embodiment, the repository 106 operates as a centralized storage point thereby allowing the components illustrated in FIG. 1 to effectively communicate with each other. For example, Tables 1-5 below illustrate various categories of data, and specific examples thereof, that may be stored in the repository in accordance with the instant disclosure.

TABLE 1

| | |
|---|---|
| Project Management - Schedule & Quality | Data concerning overall project management. May be obtained from the project management tools 108 or other resources. |
| Resources | Identifications of individual developers, their respective qualifications, roles within the project, physical locations, etc. |
| Resource Allocation | Indication of each resource's involvement with various projects |
| Task-wise Schedule | Schedule information concerning projected/actual completion dates for various tasks within a project |
| Quality Metrics & Thresholds | Identification of specific types of data to be measured for quality assessment purposes, and values to be compared with measured data of the specified types used to discriminate varying levels of quality |

TABLE 2

| | |
|---|---|
| Code Design | Data describing the structure of the software code, or from which the code structure can be inferred |
| Package Structure | Data concerning the representation of the software code in the form of packages, i.e., cohesive groupings of classes/individual code entities/files. |
| Mapping of Classes to Packages | Data concerning associations between a class and the package to which it belongs. There is always a one-to-one mapping between a class and its associated package. |
| Code Manifestation of High Level Components | Data concerning the manner in which functional components expressed in requirements or design documents manifest themselves in code. A component may be manifested in multiple classes spread across multiple packages. |

TABLE 3

| | |
|---|---|
| Quality | Data describing the quality of the software code or data used in the development thereof |
| Code Development Information | Data concerning the how the software code for a project is being developed. For example, may include event data (as described in further detail below) obtained from various individual developer workstations and information regarding individual developers |
| Individual Quality Metrics | Data describing the quality performance of an individual developer as determined by code development information corresponding to that developer |
| Aggregated Quality Metrics | Data describing the quality performance of a plurality of developers as a group as determined by code development information corresponding to those developers, e.g., across the entire project, functional groups or subgroups, etc. |
| Inferred Quality Metrics | Data that is derived from the individual and/or aggregated quality metrics, relationships between such metrics, etc. For example, complexity of a class (in the sense of object oriented programming) may be inferred from test coverage of that class. |

TABLE 4

| | |
|---|---|
| Behavioral | Data concerning the performance of individual and/or groups of developers in response to provided quality metrics |
| Recurring errors | Data concerning specific coding standards violated by a developer/group of developers including identification of the specific standard and frequency of violation |
| Time-to-fix | Data concerning the length of time it takes a developer/group of developers to fix coding standard violations |

TABLE 5

| | |
|---|---|
| Trend Data | Data concerning projected performance of individual developers/groups of developers and forecasted project quality |
| Project forecast | Data concerning the likely quality level of the project as determined by current quality violations and measured developer behavioral data |

In practice, each component illustrated in FIG. 1 may be implemented using any of a variety of well known processor-based or computer platforms. For example, the quality management component 102 and/or project management tool(s) 108 may each comprise one or more suitably configured server or desktop computers. Similarly, the repository 106 and/or code storage component 112 may each comprise one or more storage server computers implementing, in the case of the repository 106, suitable database management software or, in the case of the code storage component, such as source code control repository, examples being Concurrent Versions System (CVS), "SUBVERSION" (SVN) and "VISUAL SOURCESAFE". Further still, each developer workstation 120 may comprise one or more desktop and/or laptop computers.

Figure 2:
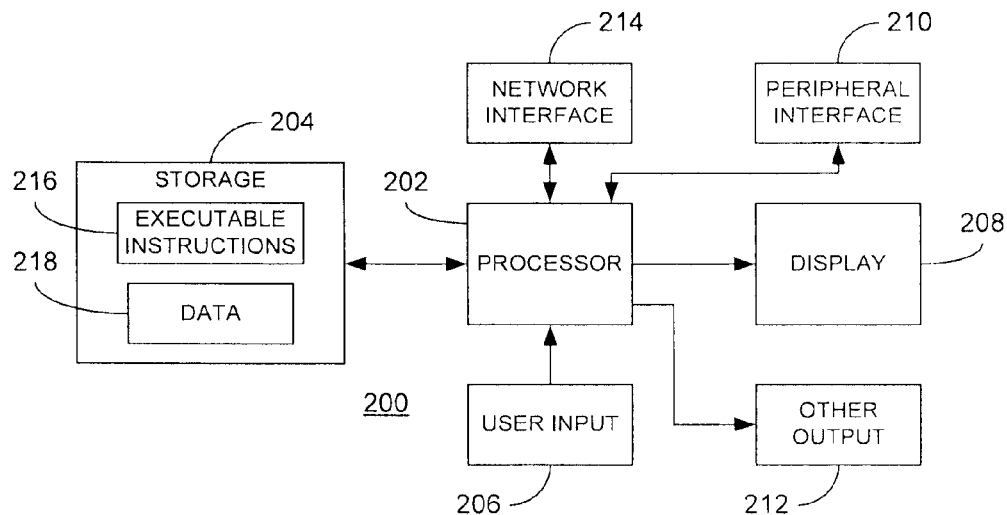
FIG. 2 is a block diagram of a processor-based platform that may be used to implement various embodiments described herein.

In accordance with the above, FIG. 2 illustrates a representative processor-based device 200 that may be used to implement the teachings of the instant disclosure. The device 200 comprises a processor 202 coupled to a storage component 204. The storage component 204, in turn, comprises stored executable instructions 216 and data 218. In an embodiment, the processor 202 may comprise one or more processing devices such as a microprocessor, microcontroller, digital signal processor, or combinations thereof capable of executing the stored instructions 216 and operating upon the stored data 218. Likewise, the storage component 204 may comprise one or more devices such as volatile or nonvolatile memory including but not limited to random access memory (RAM) or read only memory (ROM). Processor and storage arrangements of the types illustrated in FIG. 2 are well known to those having ordinary skill in the art. In one embodiment, the processing techniques for each component illustrated in FIG. 1 and described herein are implemented as a combination of executable instructions 216 and data 218 within the storage component 204.

As shown, the device 200 may comprise one or more user input devices 206, a display 208, a peripheral interface 210, other output devices 212 and a network interface 214 operatively connected to the processor 202. The user input device 206 may comprise any mechanism for providing user input to the processor 202. For example, the user input device 206 may comprise a keyboard, a mouse, a touch screen, microphone and suitable voice recognition application or any other means whereby a user of the device 200 may provide input data to the processor 202. Alternatively, where the device 200 is not configured for direct interaction with user (e.g. a server computer as opposed to a desktop or laptop computer), the input devices 206 may comprise peripheral or other input interfaces that allow the device 200 to receive inputs from sources other than directly from a user. When provided, whether integral to the device 200 or provided externally, the display 208 may comprise any conventional display mechanism such as a cathode ray tube (CRT), flat panel display, or any other display mechanism known to those having ordinary skill in the art. The peripheral interface 210 may include the hardware, firmware and/or software necessary for communication with various peripheral devices, such as media drives (e.g., magnetic'disk or optical disk drives), other processing devices or any other input source used in connection with the instant techniques. Likewise, the other output device(s) 212 may optionally comprise similar media drive mechanisms, other processing devices or other output destinations capable of providing information to a user of the device 200, such as speakers, light emitting diodes (LEDs), tactile outputs, etc. Finally, the network interface 214 may comprise hardware, firmware and/or software that allows the processor 202 to communicate with other devices via wired or wireless networks, whether local or wide area, private or public, as known in the art. For example, such networks may include the World Wide Web or Internet, or private enterprise networks.

While the representative device 200 has been described as one form for implementing the techniques described herein, those having ordinary skill in the art will appreciate that other, functionally equivalent techniques may be employed. For example, as known in the art, some or all of the functionality implemented via executable instructions may be implemented using firmware and/or hardware devices such as application specific integrated circuits (ASICs), programmable logic arrays, state machines, etc. Further still, other implementations of the device 200 may include a greater or lesser number of components than those illustrated. Once again, those of ordinary skill in the art will appreciate the wide number of variations that may be used is this manner.

Referring once again to FIG. 1, the project management tool(s) 108 may comprise tools such as Microsoft Project, Microsoft Project Server, ThoughtWorks "MINGLE", etc. As known in the art, such tools allow various management personnel to oversee software development projects, generate appropriate reports, etc. More particularly, the project management tool(s) 108 stores and manages project and software metadata, i.e., data describing the project itself as well as the software being developed. For example, and by way of non-limiting example, project and software metadata may comprise a list of software modules being developed; requirements documentation giving rise to the developed software; a list of resources (i.e., developers) in a project, including identification of each resource; a resource allocation indicating specific roles within the project assigned to each resource; task-wise schedule information; quality management metrics setup for the project as well as threshold values for each quality management metric. As known in the art, a quality metric corresponds to a particular type of data to be measured, whereas a threshold value for such metric is a value used to indicate varying levels of quality, e.g., a quality metric scoring above a certain threshold may be deemed to indicate acceptable quality whereas a score below the threshold may be deemed to indicate unacceptable quality. Through the use of multiple threshold values for a given quality metric, more fine-grained assessments indicative of increasing (or decreasing) quality levels may be provided. Regardless, the project management tool(s) 108 may be employed to provide the project and/or software metadata to the quality management component 102 that may, in turn, store the project and/or software metadata in the repository 106 (as described above relative to Tables 1-5). Alternatively, the other interface(s) 110, which may comprise any suitable input mechanism for providing at least a portion of the project and/or software metadata to the quality management component 102 and may comprise, for example, one or more user input terminals, network communication interfaces, peripheral device or system interfaces, etc.

In a typical software development project, each developer workstation 120 interacts with the code storage component 112 where the software (source) code being developed is stored. To this end, each developer workstation 120 implements one or more development tools 122 to facilitate the software development. For example, the development tool(s) 122 may comprise a so-called integrated development environment (IDE), such as the well know "ECLIPSE" IDE, Microsoft "VISUAL STUDIO", BEA "WORKSHOP", Oracle "JDEVELOPER", etc. which may incorporate its own, integrated quality determination (e.g., debugging, testing, etc.) tools or functionality. Alternatively, the development tool(s) 122 may comprise stand-alone quality determination tools such as those noted above. As discussed in greater detail below, use of the development tool(s) 122 may give rise to event data concerning the software being developed. As used herein, event data includes any data or information caused by usage of the development tool(s) 122 and concerning at least some portion of the software being developed.

As further illustrated in FIG. 1, each developer workstation 120 and, more particularly, each development tool 122, is equipped with a development tool interface component 124. The development tool interface component 124, operatively connected to the development tool, is adapted to detect event data as it arises within the development tool 122. For example, the development tool interface component 124 may comprise a so-called "plug-in" device or program or equivalent thereof configured to communicate with (e.g., send queries to) an application protocol interface (API) established by the development tool 122. As known in the art, an API may be used to gain access to a variety of data internal to a program, such as event data arising within the development tool 122. In an alternative embodiment, the development tool interface component 124 monitors one or more logs maintained by the development tool. In this embodiment, the development tool 122 automatically stores event data as it occurs in one or more logs, which the development tool interface component 124 subsequently reads according to any suitable basis (e.g., periodically, as-needed, etc.). As described in further detail below, the development tool interface component 124 can be configured to monitor for specific events or event types.

As the development tool interface component 124 detects event data, it stores the event data in a local storage 126, such as data storage 218 as shown in FIG. 2. Thereafter, from time to time, a development tool reporting component 128 outputs the event data stored in the local storage 126 as part of code development information. In one embodiment, the development tool reporting component 128 is not uniquely configured to interact with any one development tool 122, as in the case of the development tool interface component 124. Instead, the development tool reporting component 128 is configured to process whatever event data is stored in the local storage (regardless of it originating source). In operation, the development tool reporting component 128 will typically output the code development information to the repository 106. However, it will be appreciated by those having ordinary skill in the art that the code development information may be provided to other devices, e.g., directly to the quality management component 102 as illustrated by the dashed interconnection line traversing the networks(s) 104. In an embodiment, the quality management component periodically (e.g., daily) checks the repository for code development information stored therein. Furthermore, the development tool reporting component 128 may also provide, via a suitable interface device such as the display 208 illustrated in FIG. 2, informational, warning and/or error messages or alerts to a user of the developer workstation 120.

Figure 3:
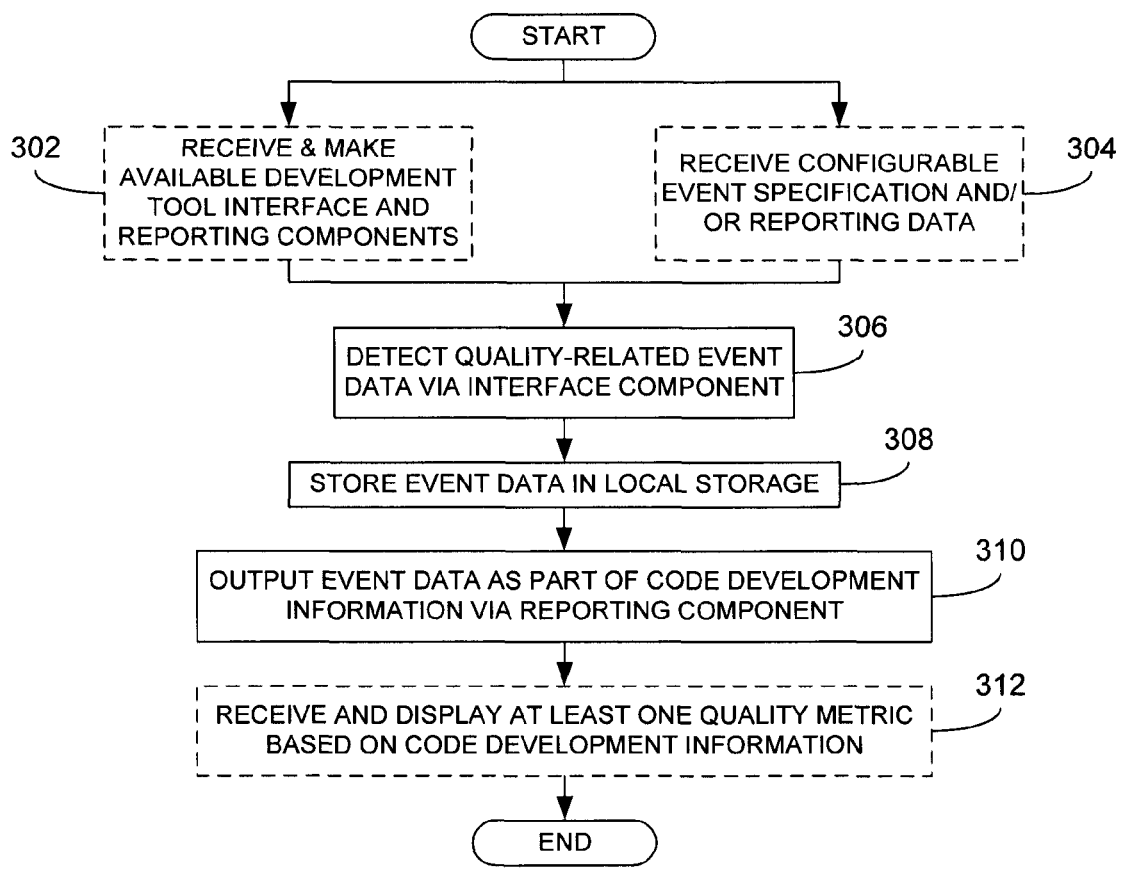
FIG. 3 is a flowchart illustrating the collection and handling of code development information within a developer workstation in accordance with the instant disclosure.

Referring now to FIG. 3, a flowchart illustrating collection and handling of code development information within a developer workstation is provided. Thus, optionally beginning at block 302, the developer workstation receives and makes available the development tool interface and reporting components required for the development tools implemented by the developer workstation. In an embodiment, the necessary development tool interface and reporting components are obtained from quality management server or any other appropriate source and made available at the developer workstation. To assist in the aforesaid process of identifying the necessary development tool interface and reporting components, a GUI may preferably produce a list of development tool interfaces and reporting components already available or non available with the developer workstation.

After receiving the necessary development tool interface and reporting components, the same are made available at the developer workstation (for e.g., installed, set any necessary environmental variables such as set the network location of the repository server, local storage of development tool logs etc.) and automatically configured for any event specification or event reporting values in the development tool-specific interface components to default values. Such default values may be entered by a project administrator or the like via a user interface implemented by the quality management component.

In parallel with block 302, processing may also optionally occur at block 304 where configurable event specification data and/or configurable event reporting data may be received at the workstation via, for example, a user input device or network connection implemented by the workstation. Both the configurable event specification and the configurable event reporting data may be represented in any convenient representation format, as known in the art. The configurable event specification data may comprise values used to control what events are detected, and how they are detected, by each development tool interface component. In a similar vein, the configurable event reporting data may comprise values used by a development tool reporting component to output the event data. For example, the event specification data may set forth which development tools are to be monitored, what specific events are to be monitored and the granularity of the monitoring to be performed, i.e., the frequency with which the event data is sent to the repository. Likewise, the event reporting data may set forth how often or in response to what stimulus (e.g., a predetermined quantity of unreported event data having been stored) the reporting component outputs the event data. Being configurable, event specification and event reporting data may be received at virtually any time, and incorporated into operation of the interface and reporting components, thereby allowing significant flexibility in configuring performance of quality assessments in a software development system.

Once the necessary interface and reporting components are made available and configured in a developer workstation, processing may continue at block 306 where event data concerning at least one quality-related issue is detected by the development tool interface component. Representative event data detected by a development tool interface component (as determined by the configurable event specification data) may comprise, by way of example only and not limitation, an indication of a given event's category (e.g., what kind of an event it is), an identification of the generator of the event (e.g., the development tool giving rise to the event), event details describing the circumstances giving rise to the event and a date and/or time stamp when the event occurred. For example, of an event may comprise a "File Change" and its associated information may comprise a "Modified Time", "File Name", "Modified By", "Source control version", etc. Those having ordinary skill in the art will appreciate that various types of events may be related to quality of software code more directly than other types of events. As non-limiting examples, an event corresponding to a coding syntax error or a violation of a code standard will clearly be related to the quality of the software code and would therefore qualify as an event concerning a quality-related issue. In contrast, an event such as an indication of loss of communication between the developer workstation and the code storage component, while obviously important to the overall success of the project, is generally unrelated to the quality of the software code itself and would therefore be unlikely to require monitoring and reporting. Broader in scope than the event data, code development information (in addition to the event data) may comprise, by way of non-limiting example, an identification of the developer using the developer workstation at the time of the detected event and/or a release name/number for which the code being operated upon by the development tool is being generated.

Continuing at block 308, the event data is stored by the development tool interface component in a local (relative to the developer workstation) storage or memory, such as the local storage 126 illustrated in FIG. 1. Any suitable data storage format known to those having ordinary skill in the art may be used for this purpose. Thereafter, at block 310, the development tool reporting component may read the event data stored in the local storage and output the event data as at least part of code development information. As noted above, the code development information may be provided to the repository 106 although, in other embodiments, it may be provided to other components. Regardless of the destination, standardized network communication protocols may be used by the development tool reporting component when providing the code development information to the repository or other destination. In one embodiment, the development tool reporting component outputs the event data in this manner in accordance with the configurable event reporting data, e.g., according to reporting intervals established by the configurable event reporting data. Storing and reporting event data in this manner (assuming the local storage is sufficiently large) allows the asynchronous event data to be synchronized according to a designated reporting interval (or other basis established by the event reporting data) and thereby more efficiently processed by the quality management component.

Optionally, at block 312, processing may continue where the developer workstation receives at least one quality metric, based on the previously output code development information, from the quality management component. As described herein, the at least one quality metric may comprise one or more individual quality metrics concerning performance of a particular user (developer) associated with the workstation, or may comprise one or more aggregated quality metrics concerning performance across a portion of the overall project larger than an individual developer. Regardless, upon receipt, the workstation may display the quality metric(s) to a user thereof via a suitable display device.

Figure 4:
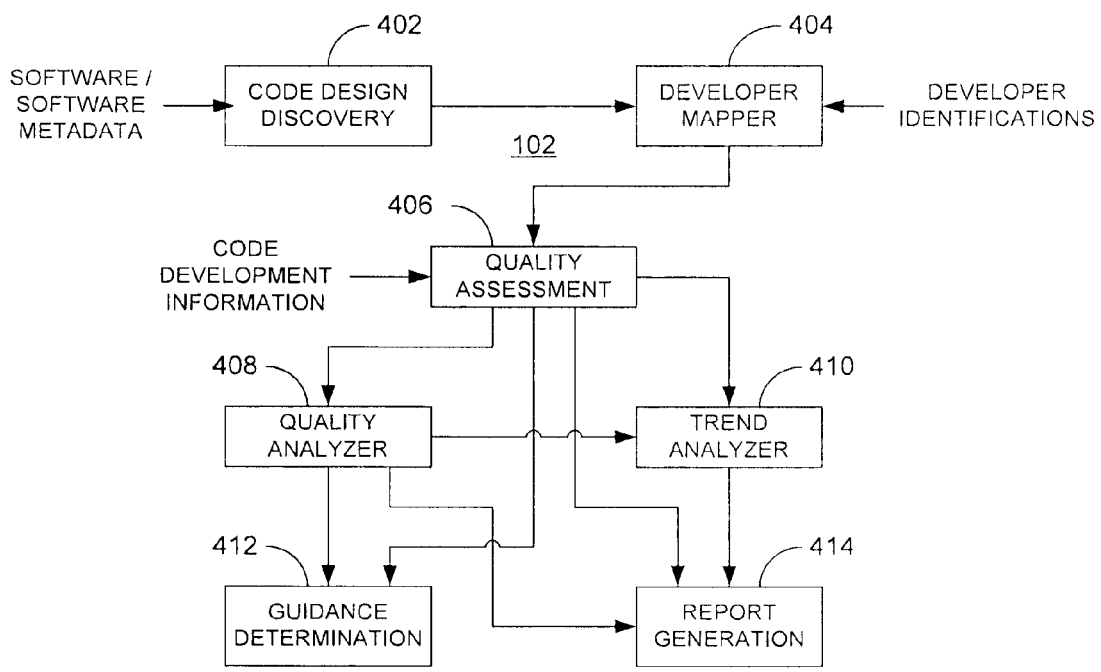
FIG. 4 is a block diagram illustrating structure of a quality management component in further detail.

Referring now to FIG. 4, a quality management component 102 is illustrated in further detail. As noted above, the quality management component 102 is preferably implemented using any of a variety of well known processor-based platforms or other hardware/firmware based implementations may be used as well. The quality management component 102 comprises a code design discovery component 402 operatively connected to a developer mapper component 404 that, in turn, is operatively connected to a quality assessment component 406. The code design discovery component 402 receives as input software code and/or software code metadata. Through analysis of the software code and/or software code metadata, the code design discovery component 402 determines design data that describes structure of the software code. For example, the software code/software code metadata may be analyzed to determine, in the representative example of object-oriented software code, how packages (i.e., a group of related classes) are structured, which classes (i.e., templates used to abstractly represent a real-world thing in software, specific instances of which may be considered objects) belong to which packages, how high-level code modules are manifested in the software code, etc. (As used herein, a module comprises any discrete, uniquely identifiable portion of source code, such as individual source code text files as known in the art.) For example, in the case of the software code itself, a semi-automated approach may be employed in which a dependency analysis is automatically performed on the code base for a project (i.e., substantially all of the code for the project) to identify dependencies between various packages within the code base. Thereafter, a subject matter expert can analyze the resulting dependencies to map portions of the dependency graph into high-level modules. Furthermore, as known in the art, architecture recovery tools can assist the subject matter expert in this mapping. In this manner, a list of classes constituting a module may be created.

Alternatively, the design data may be determined based on the software code metadata. As noted above, non-limiting examples of software code metadata may include a list of code modules being developed; requirements documentation giving rise to the developed software; a list of resources (i.e., developers) in a project, including identification of each resource; a resource allocation indicating specific roles within the project assigned to each resource; task-wise schedule information; quality management metrics setup for the project as well as threshold values for each quality management metric. Various techniques may be employed by the code design discovery component 402 to obtain the relevant software code metadata and, consequently, the design data. For example, as known in the art, various project management tools often comprise an API that provides access to data within a given project management tool's database. Given this, the code design discovery component 402 may comprise one or more adapters capable of accessing data via a given project management tool's API. Adapters capable of accessing data via an API are well known in the art. If necessary, the adapter(s) may transform the collected data into any convenient form used to represent a model of the project. In this context, the project model captures the relationships between different project entities, e.g., humans, code, tools and servers. In an embodiment, these relationships are captured using relations such as "Belongs to", "Performs", "Reviews", "Contributes" etc. By periodically accessing such data, any changes in the data tracked by the project management tool can be obtained and used to update the project model.

In another metadata-based embodiment, the data maintained by a project management tool can be exported to the code design discovery component 402. In this case, as known in the art, the data to be exported may be transformed into an intermediate format supported by the project management tool and, after receipt of the transformed data, converted into a format used by the code design discovery component 402 to model the project. In yet another embodiment, a "wizard" graphical user interface or expert system, as known in the art, may be provided by the code design discovery component 402 thereby allowing an appropriate person, e.g., a project quality leader or the like, to directly enter the metadata. Once again, once the metadata has been received via the wizard, it may be converted, if necessary, into whatever form is needed to model the project.

As illustrated in FIG. 4, the code design discover component 402 provides the design data to the developer mapper component 404. The developer mapper component 404, on an ongoing basis, associates particular developers (or resources) with particular software modules (as indicated by the design data) thereby providing a developer mapping. In one embodiment, this association, as noted above, may already be incorporated into the design data, i.e., the metadata taken from a project management tool may already include this type of association. In this case, the developer mapper component 404 simply extracts the developer mapping from the design data. Alternatively, the developer mapper component 404 may be provided with developer identifications, as shown in FIG. 4, that uniquely identify each developer working on a given project. As known in the art, the event data (described above) generated by a developer typically includes data concerning the specific portion of the software code that was being operated upon when the event data was generated. Thus, for each developer identification, the developer mapper component 404 may inspect that event data generated by that developer to determine what portions of the software code (e.g., specific classes that can be compared to the design data) the developer has worked on. By continually inspecting event data in this manner, a list of those portions of the software code that a particular developer is working on can be continually updated.

As known in the art, however, it is often the case that a developer works on a given portion of software code on a temporary or ad hoc basis, as in the case of a developer working on a portion of code only for debugging or quality review activities. While it may be desirable to track such associations, it may also be desirable to avoid excessive complication of the developer mapping by "filtering" such transient associations. To this end, thresholding may be employed to qualify any association between a developer and a given portion of software code, the assumption being that a transient participant in the development of a portion of software code will have only a relatively small number of events in conjunction with that portion of code, whereas a developer that is truly responsible for that code will have a significantly higher number of events. Based on this assumption, for example, a threshold of a minimum number of events for a developer in conjunction with the portion of code may be employed for this purpose. As another example, the threshold may comprise a minimum percentage of the overall total number of events (across all developers) for the portion of code being attributable to a developer.

It will be further appreciated that the above-described techniques for establishing the developer mapping may be combined. For example, an initial developer mapping may be created based on extraction from the design data. Thereafter, the event-based approach may be employed to reflect changes in responsibility by both adding new developer associations and removing older, outdated associations.

Regardless of the particular technique used to establish and maintain the developer mapping, the developer mapping is provided, along with the above-described code development information, to the quality assessment component 406, as illustrated in FIG. 4. Based on these inputs, the quality assessment component 406 determines at least one quality metric that, in various embodiments, may comprise individual and/or aggregated quality metrics.

For example, in an embodiment, the quality metrics are determined according to various per code entity bases, e.g., in the example of object-oriented programming, method, class and package. In this embodiment, the quality-related event data (included in the code development information) received by the quality assessment component 406 is divided according to the relevant code entities, e.g., per method, per class and per package characterizations. Thereafter, specific quality metrics may be determined by aggregating the now-characterized data according to one or more meaningful attributes. For example, in the case of a resource operating as a developer, method-level quality data concerning adherence to best coding practices such as exception handling, correct usage of logging frameworks, security related practices, performance related practices etc. associated with that developer would be appropriate. Conversely, for a resource having overall responsibility for a module comprising multiple methods, module-level quality data would be provided in which the quality-related event data for the relevant methods is aggregated according to the module definition. Those having ordinary skill in the art that will appreciate that any of a variety of bases may be employed to appropriately organize the quality related event data.

Furthermore, other quality measurements may be inferred from the quality metrics determined according to the quality-related event data. For example, as known in the art and again referring to object-oriented programming, the complexity of a class is related to the test coverage for that class. In this example, a negative correlation (i.e., relatively low test coverage for the class) leads to the inference of decreased quality of the class. Other examples of such inferred quality measurements will be apparent to those having ordinary skill in the art. As such inferred measurements are dependent upon the data-based metrics, they may be defined as rules implemented by the quality assessment component 406.

As part of the quality metrics, various composite scores may be established by the quality assessment component 406 as well. For example, on an individual level, a composite score may be calculated. In one embodiment, such an individual composite score is determined on a daily basis for each developer, although it understood that a different interval (e.g., every other day, once a week, etc.) could be equally employed. Regardless, in an embodiment, two types of individual composite quality scores are determined. The first, a Personal Quality Score 1 (PQS1), is a composite score based on the violations reported by code quality tools during an analysis interval. In this embodiment, PQS1 is the ratio of the weighted sum of the violations categorized into different severity levels (e.g. High, Medium and Low severity) to the total number of non-commenting source statements in those portions of the software code developed by the developer during the analysis interval. The weights are assigned to each severity category based on the project manager's perception of the criticality of a category from a project perspective. Regarding the second, a Personal Quality Score 2 (PQS2), can be calculated. PQS2 is the ratio of the weighted sum of the violations categorized into different severity levels (e.g. High, Medium and Low severity) to the total number of "modified" non-commenting source statements in those portions of the software code modified by the developer during the analysis interval. While PQS1 gives an indication of the impact on quality of the modified software code, PQS2 is a more developer-centric and personal metric that indicates the quality of the "last modification episode" of a developer. In a further embodiment, another score, the Failed To Successful Unit Tests ratio (FSUT), is also determined. While PQS1 and PQS2 reflect the adherence of the developer to coding best practices, FSUT reflects functional quality of the code as determined by unit testing, as known in the art. PQS1, PQS2 and FSUT ratios are normalized to allow appropriate comparison and benchmarking. In these embodiments, the quality metrics described above for that individual are combined to provide a Developer Quality Score (DQS); an individual quality score for that developer. DQS may be calculated as a two step process. First, a weighted average of PQS1 and FSUT is calculated. The weights are predetermined by the project manager to reflect the importance given by the project to adherence to coding standards vis-à-vis functional testing. Based on the weighted average, a lookup table is used to map the weighted average to the DQS score. Alternatively, DQS may be determined by associating project-specific thresholds on PQS1 and FSUT to determine whether PQS1 and FSUT individually are "good" or violating norms. Based on this individually determined sufficiency of PQS1 and FSUT, a table lookup mapping these two parameters to the DQS provides the developer-specific DQS. In either case, it may be desirable to make the constituent PQS1 and FSUT data leading to the DQS and, likewise, the constituent violations leading to the PQS1, available for inspection to a user (e.g., the developer in question), thereby allowing the user to understand the rationale behind the DQS.

In a similar vein, aggregated quality metrics corresponding to portions of software attributable to more than a single developer (e.g., from a small team of developers all the way up to the entire project's development team) may be determined. Once again, such aggregated quality metrics may be determined on a daily basis or according to some other interval. Generally, this accomplished by retrieving those quality metrics at the desired level of abstraction and determining scores according to that level of abstraction. Further scores at higher levels of abstraction (e.g., a broader abstraction levels) may then be determined by combining the initial aggregated scores.

As an example, and once again using object-oriented programming as a representative illustration, the class-level quality metrics (regardless of the underlying developer(s)) are collected and used to determine, for each class, a class-level composite quality sub-score. Thereafter, the various class-level sub-scores may be aggregated according to package-level boundaries and, for each package, used to determine package-level sub-scores. This process is then repeated once again across all of the package-level sub-scores to arrive at a project-wide composite quality score. In a similar vein to the embodiments described above regarding individual scores, during each analysis interval, violations from multiple developers affecting a particular class are grouped to find the quality score for that portion. The method of calculating this score is essentially the same to PQS1, as described above. Further, the class-level scores are averaged across the package for the package-level aggregation. Similarly, package level scores are aggregated to a project-wide score. Alternatively, when aggregation is done, the class-level or package-level scores can be weighted with factors related to the size of a class, complexity of a class, coupling metrics of a package and the functional criticality of a package. Using these weights it is possible to refine the scores derived before.

Referring once again to FIG. 4, various additional components 408-414 arc illustrated being operatively connected to the quality assessment component 406 and/or each other. For example, a quality analyzer component 408 is illustrated. The quality analyzer component 408 takes as input the quality metrics for various portions of code, individual developers and/or groups of developers and analyzes this data to determine behavior data In one example, individual developer behavior may be assessed according to the frequency and distributions of quality violations attributed to a given developer. This may be tracked through simple inspection of the types of quality violations occurring as indicated in the event data. For example, one developer may have violations occurring in a wide variety of areas and/or types, but with relatively low frequency. This may suggest that the developer is diligent about his/her work and is gaining exposure to different development concepts. Alternatively, another developer may have only a few types of violations, but that occur with relatively higher frequency. This may suggest that the developer is struggling with certain development concepts or is somewhat inattentive to certain concepts. Regardless whether violation frequencies and/or distributions are tracked, they may be updated on any convenient or desired basis, e.g., daily, weekly, etc.

As another example in the case of an individual developer, behavior analysis may include analysis that fosters an understanding how a developer reacts when quality standards are violated or poor quality metrics/scores are reported. To this end, the quality metrics and scores described above may be tracked for each developer over a given time interval, e.g., since the beginning of the developer's involvement with the project, since the beginning of the developer's employment, since the last behavioral report, etc., thereby effectively providing a timeline of when various violations have occurred. In one embodiment, the amount of time required by the developer to fix each violation (as indicated, for example, by an improvement in the relevant quality metric(s) or the lack of repeat of the same error as indicated by the event data) is likewise tracked. An average time-to-fix across all such quality violations may then be tracked to assess how well the developer responds to the quality metrics. Alternatively, the times-to-fix may be grouped and averaged according to violation type to determine if the developer takes more time on certain type of violations than others to fix the underlying problems. Such behavior may then be used to suggest specific training if the developer appears to be struggling with specific types of violations. Further still, where violations are given varying priorities (e.g., high priority violations requiring immediate attention versus lower priority violations that may be deferred for varying periods of time according to their severity), the time-to-fix averages may be determined according to priority levels once again providing insight into how the developer responds to certain stimuli, in this case, priority levels of violations. As in previous embodiments, the timeto-fix averages described above may be updated on a daily basis or upon some other time interval as a matter of design choice.

Furthermore, the above-described individual behavior analyses may also be performed on the basis of groups of developers, e.g., all of the developers working for a specific manager. In this manner, potential quality issues originating from management-level personnel (e.g., improper instruction concerning project-wide coding standards) may be uncovered.

As further shown, a trend analyzer component 410 may be provided that operates upon the behavior data determined by the quality analyzer component 408 as well as the quality metrics provided by the quality assessment component 406. In particular, the trend analyzer component 410 is provided to assess the impact of daily (or whatever desired interval is employed) developer quality on significant project milestones, e.g., integration builds. As known in the art, build quality milestones are typically specified as "the acceptable level of quality attributes following an integration build" or "the acceptable level of system-wide composite quality attribute following an integration build". Since these significant project milestones occur at relatively coarse temporal granularity, project managers do not have insight in to the code quality during the intermediate period. This lack of insight can lead to rework on account of poor quality. Since the rework happens only after milestone, the developers have to manage not only the rework but also the new work that is part of the development work to be performed prior to the next significant project milestone. This can lead to schedule slippage and consequently quality may suffer yet again. To mitigate these potential problems, temporally fine-grained (e.g., daily, weekly, etc.) trend analysis may be performed based on the abovedescribed quality metrics and/or behavior data.

Alternatively, developer behavior may be used to forecast overall quality for a project prior to the next significant project milestone. For example, based on the developer behavior described above, the trend analyzer component 410 can predict whether the quality attribute violations introduced by developers will be resolved prior to the next milestone or will continue to remain unresolved. To this end, the average time-to-fix values for developers are inspected and any open (i.e., unresolved) quality violations on any given day are pruned to include only those that are likely to persist past the next milestone. Based on this, the remaining violations are mapped back to the relevant portions of code to which they pertain, thereby allowing one or more prospective quality metrics to be determined for the affected portions of code. Similarly, these prospective quality metrics may be processed as described above to arrive at aggregated prospective quality metrics, thereby providing an overall trend indication for the project (or portions thereof).

Using the same inputs as the trend analyzer component 410, a guidance determination component 412 may also be provided to provide targeted guidance to each individual developer in light of the quality violations and behaviors attributable to the developer. For example, this may be done based on personal quality benchmarking or awareness of each developer's contribution to the project's quality. With regard to the former, individual developers may be provided with personal quality benchmarking (according to the above-described quality metrics and scores) that includes comparison to his/her peers. For example, on a daily basis, a comparison between a developer's personal quality score is compared with an average team score. The comparison can be visualized as a percentile or other similar presentation mode. With regard to the latter, the an individual developer's contribution to a project's quality is determined based on the percentage contribution of the developer's quality standard violations to the system-wide composite or overall quality. Alternatively, the contribution can be determined according to the number of unresolved quality standard violations associated with the developer. This number is weighted by the number of days remaining until the next significant project milestone, e.g., an integration build. Thus, as the project milestone comes closer; the weighting factor for this particular measurement is increased, thereby suggesting to the developer that the potential negative impact of the individual quality violations on the project quality is increasing and that prompt action would be advisable.

Finally, a reporting component 414 is provided to generate reports based on the outputs provided by the above-described components 406-410. In an embodiment, such reports may be generated in response to specific reporting requests designating the types of data to be included in the report. Thus, any of the quality metrics or composite scores determined by the quality assessment component 406, the behavior data provided by the quality analyzer component 408, and/or the trend/forecasting data determined by the trend analyzer component 410 may be included in the report. Note that all of the data provided by the illustrated components 406-410, along with the code development information may be stored in the repository 106. As such, known techniques for generating reports according to the data stored in the repository 106 may be employed. For example, the reporting component 414 may implement a graphical user interface that prompts a user for the desired data to be reported. Based on the user's inputs, suitable database queries may be automatically formulated and used to extract the appropriate data from the repository 106. The extracted data may then be appropriately formatted and provided as output to any desired output channel, e.g., to an email program for transmission to the user, to a display, to a printer, etc.

Figure 5:
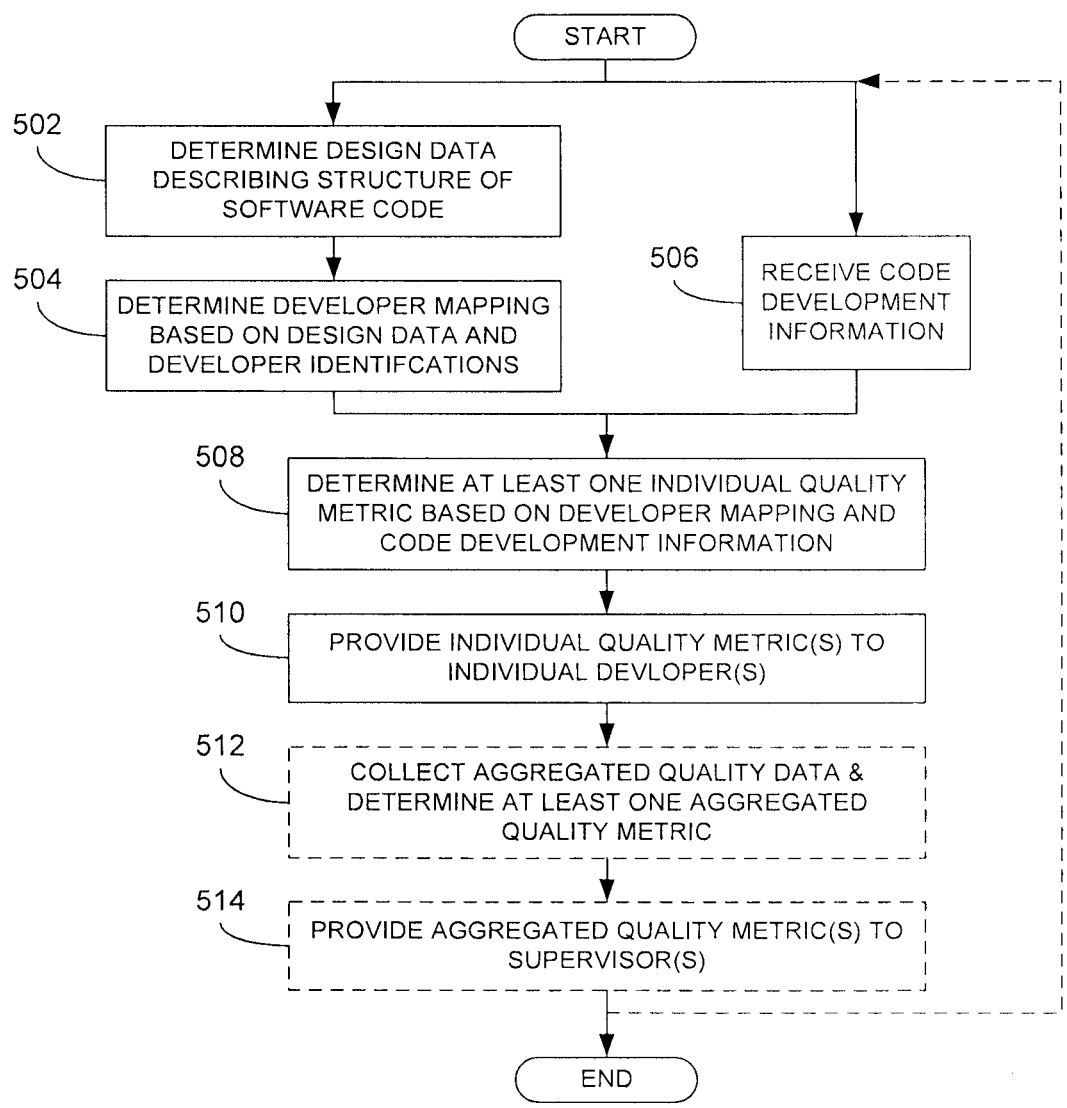
FIG. 5 is a flowchart illustrating the determination of one or more quality metrics based on a developer mapping and code development information in accordance with the instant disclosure.

Referring now to FIG. 5, processing according to a quality management component is further illustrated. Thus, beginning at block 502, design data describing structure of the software code under consideration is determined and, based on the design data, a developer mapping is determined at block 504. In parallel, at block 506, code development information is received (or retrieved) by the quality management component. Note that the parallel paths are shown to illustrate the possibility that design data and developer mappings may be continually updated while development work and, therefore, the production of code development information, is ongoing.

Regardless, processing continues at block 508, where the quality management component determines at least one individual quality metric for each developer, as described above, based on the developer mapping and the code development information. Thereafter, at block 510, the quality management component provides the at least one individual quality metric to the respective individual developers. In a similar vein, as optionally shown at block 512, quality data may be aggregated and used to determine one or more aggregated or composite quality metrics or scores, which aggregated quality metrics may be optionally provided, at block 514, to the appropriate recipients, e.g., supervisors and/or managers. As further illustrated by the dotted line leading from block 514 to blocks 502 and 506, this process may be repeated according to any desired interval, e.g., daily, weekly, etc.

As described above, the instant disclosure provides techniques for processing and collecting code development information that allows software development projects to leverage the advantages of de-centralized quality assessment approaches while minimizing or substantially overcoming their shortcomings. In particular, developer-centric assessments are collected and analyzed in order to determine individual quality metrics/scores and aggregated or composite quality metrics/scores. The resulting quality metrics/scores can be reported to individual developers according to any convenient schedule in order to provide real-time performance support, thereby promoting faster conformance to benchmarks and enhanced productivity. Similarly, report generation capabilities enable the project managers and supervisors to obtain appropriate composite assessments. While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

We claim:
1. A method comprising:
receiving, by a device including a processor, event data associated with code development by another device, the other device being different than the device;
determining, by the device and based on the received event data, design information associated with the code;
determining, by the device and based on the determined design information and information associated with the other device, a developer mapping,
the developer mapping indicating portions of the software code corresponding to a developer;
determining, by the device and based on the developer mapping, a quality metric for the developer associated with the other device;
determining, by the device and based on the quality metric, behavior information for the developer based on information associated with a frequency and distribution of the event data;
determining, by the device and based on the behavior information and the quality metric, information associated with one or more trends of the developer using quality data for the developer that is based on a responsibility scope associated with the developer,
the information associated with the one or more trends of the developer being used to forecast an overall quality of the code development; and outputting, by the device, at least one of the determined quality metric, the determined behavior information, or the determined information associated with one or more trends of the developer.

2. The method of claim 1, where the event data is received from at least one of:
a development tool application protocol interface, or
a development tool log.

3. The method of claim 1, further comprising:
receiving the event data based on event specification data representative of types of events associated with the code development.

4. The method of claim 1, further comprising:
receiving configurable event reporting data indicating how the device should output the event data; and
using the received configurable event reporting data to output the at least one of the determined quality metric, the determined behavior information, or the determined information associated with one or more trends of the developer.

5. The method of claim 1, where information associated with the code development includes at least one identification corresponding to the other device.

6. The method of claim 1, further comprising:
providing, for display, information associated with the quality metric.

7. A device comprising:
a memory to store instructions; and
a processor to execute the instructions to:
receive event data associated with code development by another device,
the other device being different than the device;
determine, based on the received event data, design information associated with the code;
determine, based on the determined design information and information associated with the other device, a developer mapping,
the developer mapping indicating portions of the software code corresponding to a developer;
determine, based on the developer mapping, a quality metric for the developer associated with the other device;
determine, based on the quality metric, behavior information for the developer based on information associated with a frequency and distribution of the event data;
determine, based on the behavior information and the quality metric, information associated with one or more trends of the developer using quality data for the developer that is based on a responsibility scope associated with the developer,
the information associated with the one or more trends of the developer being used to forecast an overall quality of the code development; and
output at least one of the determined quality metric, the determined behavior information, or the determined information associated with one or more trends of the developer.

8. The device of claim 7, where the processor, when receiving the event data, is to receive the event data from at least one of:
a development tool application protocol interface, or
a development tool log.

9. The device of claim 7, where the processor is further to:
receive the event data based on event specification data representative of types of events associated with the code development.

10. The device of claim 7, where the processor is further to:
receive configurable event reporting data indicating how the device should output the event data; and
use the received configurable event reporting data to output the at least one of the determined quality metric, the determined behavior information, or the determined information associated with one or more trends of the developer.

11. The device of claim 7, where information associated with the code development includes at least one identification corresponding to the other device.

12. The device of claim 7, where the processor is further to:
provide, for display, information associated with the quality metric.

13. A method comprising:
determining, by one or more devices each including a processor, design data associated with a structure of software code;
determining, by the one or more devices and based on the determined design data and developer identifications corresponding to a plurality of developers, a developer mapping indicating portions of the software code corresponding to the plurality of developers;
determining, by the one or more devices and based on the determined developer mapping, code development information;
determining, by the one or more devices and based on the code development information, respective behavior information for each of the plurality of developers based on information associated with a frequency and distribution of the design data;
determining, by the one or more devices and based on the respective behavior information and the code development information, information associated with one or more trends of each of the plurality of developers using respective quality data for each of the plurality of developers that is based on a responsibility scope associated with a respective role for each of the plurality of developers,
the information associated with the one or more trends of each of the plurality of developers being used to forecast an overall quality of the software code; and
providing, by the one or more devices, at least one aggregated quality metric based on the determined information associated with one or more trends of each of the plurality of developers.

14. The method of claim 13, where, when determining the code development information, the method further includes:
receiving a respective developer identification for each of the plurality of developers.

15. The method of claim 13, where, when determining the respective behavior information for each of the plurality of developers, the method further includes:
selecting a plurality of portions of the software code, each of the plurality of portions of the software code corresponding to a different developer of the plurality of developers; and
determining, using the selected plurality of portions of the software code, the respective quality data for each of the plurality of developers,.

16. The method of claim 13, further comprising:
determining a respective quality metric for each developer of the plurality of developers,
each respective individual quality metric being included in the at least one aggregated quality metric; and
providing, to each developer of the plurality of developers, the respective individual quality metric.

17. A non-transitory computer readable medium storing instructions, the instructions comprising:
one or more instructions which, when executed by at least one processor of a device, cause the at least one processor to:
receive, event data associated with code development by another device,
the other device being different than the device;
determine, based on the received event data, design information associated with the code;
determine, based on the determined design information and information associated with the other device, a developer mapping,
the developer mapping indicating portions of the software code corresponding to a developer;
determine, based on the developer mapping, a quality metric for the developer associated with the other device;
determine, based on the quality metric, behavior information for the developer based on information associated with a frequency and distribution of the event data;
determine, based on the behavior information and the quality metric, information associated with one or more trends of the developer using quality data for the developer that is based on a responsibility scope associated with the developer,
the information associated with the one or more trends of the developer being used to forecast an overall quality of the code development; and
output at least one of the determined quality metric, the determined behavior information, or the determined information associated with one or more trends of the developer.

18. The non-transitory computer readable medium of claim 17, where the instructions to receive the event data include:
one or more instructions to receive the event data from at least one of:
a development tool application protocol interface, or
a development tool log.

19. The non-transitory computer readable medium of claim 17, where the instructions further include:
one or more instructions to receive the event data based on event specification data representative of types of events associated with the code development.

20. The non-transitory computer readable medium of claim 17, where the instructions further include:
one or more instructions to receive configurable event reporting data indicating how the device should output the event data; and
one or more instructions to use the received configurable event reporting data to output the at least one of the determined quality metric, the determined behavior information, or the determined information associated with one or more trends of the developer.

21. The non-transitory computer readable medium of claim 17, where information associated with the code development includes at least one identification corresponding to other device.

22. The non-transitory computer readable medium of claim 17, where the instructions further include:
one or more instructions to provide, for display, information associated with the quality metric.

23. A device comprising:
a memory to store instructions; and
a processor to execute the instructions to:
receive, design data associated with a structure of software code;
determine, based on the received design data and developer identifications corresponding to a plurality of developers, a developer mapping indicating portions of the software code corresponding to the plurality of developers;
determine, based on the determined developer mapping, code development information;
determine, based on the code development information, respective behavior information for each of the plurality of developers based on information associated with a frequency and distribution of the design data;
determine, based on the respective behavior information and the code development information, information associated with one or more trends of each of the plurality of developers using respective quality data for each of the plurality of developers that is based on a responsibility scope associated with a respective role for each of the plurality of developers,
the information associated with the one or more trends of each of the plurality of developers being used to forecast an overall quality of the software code; and
provide at least one aggregated quality metric based on the determined information associated with one or more trends of each of the plurality of developers.

24. The device of claim 23, where the processor, when determining the code development information, is further to:
receive a respective developer identification for each of the plurality of developers.

25. The device of claim 23, where the processor, when determining the respective behavior information for each of the plurality of developers, is further to:
select a plurality of portions of the software code, each of the plurality of portions of the software code corresponding to a different developer of the plurality of developers; and
determine, using the selected plurality of portions of the software code, the respective quality data for each of the plurality of developers.

26. The device of claim 23, where the processor is further to:
determine a respective quality metric for each developer of the plurality of developers,
each respective individual quality metric being included in the at least one aggregated quality metric; and
provide, to each developer of the plurality of developers, the respective individual quality metric.

* * * * *